United States Patent [19]
Klang

[11] Patent Number: 5,583,416
[45] Date of Patent: Dec. 10, 1996

[54] APPARATUS AND METHOD FOR STEP-CHARGING BATTERIES TO OPTIMIZE CHARGE ACCEPTANCE

[75] Inventor: James K. Klang, Rosemount, Minn.

[73] Assignee: GNB Battery Technologies, Inc., Mendota Heights, Minn.

[21] Appl. No.: 188,957

[22] Filed: Jan. 26, 1994

[51] Int. Cl.⁶ .......................... H01M 10/44; H01M 10/46
[52] U.S. Cl. .................... 320/22; 320/39; 320/32
[58] Field of Search .................. 320/22, 23, 24, 320/30, 31, 32, 39

[56] References Cited

U.S. PATENT DOCUMENTS

| | | |
|---|---|---|
| 3,421,067 | 1/1969 | Wilson et al. . |
| 3,424,969 | 1/1969 | Barry . |
| 3,517,293 | 6/1970 | Burkett et al. . |
| 3,517,295 | 6/1970 | Lapuyade . |
| 3,609,503 | 9/1971 | Burkett et al. . |
| 3,758,839 | 9/1973 | Medlar . |
| 3,816,806 | 6/1974 | Mas . |
| 3,816,807 | 6/1974 | Taylor . |
| 3,864,617 | 2/1975 | Smith et al. ............... 320/23 |
| 3,936,718 | 2/1976 | Melling et al. ............ 320/21 |
| 4,131,841 | 12/1978 | Bennefeld . |
| 4,146,830 | 3/1979 | Foster ...................... 320/23 |
| 4,191,916 | 3/1980 | Zasio et al. . |
| 4,220,905 | 9/1980 | Quarton . |
| 4,270,080 | 5/1991 | Kostecki . |
| 4,354,148 | 10/1982 | Tada et al. ................ 320/39 |
| 4,388,582 | 6/1983 | Saar et al. . |
| 4,396,880 | 8/1983 | Windebank ............... 320/21 |
| 4,503,378 | 3/1985 | Jones et al. . |
| 4,549,127 | 10/1985 | Taylor et al. ............. 320/21 |
| 4,629,965 | 12/1986 | Fallon et al. . |
| 4,668,901 | 5/1987 | Furukawa . |
| 4,710,694 | 12/1987 | Sutphin et al. . |
| 4,740,739 | 4/1988 | Quammen et al. . |
| 4,742,290 | 5/1988 | Sutphin et al. . |
| 4,745,349 | 5/1988 | Palanisamy et al. . |
| 4,829,225 | 5/1989 | Podrazhansky et al. . |
| 4,956,597 | 9/1990 | Heavey et al. . |
| 5,013,992 | 5/1991 | Eavenson et al. . |
| 5,049,803 | 9/1991 | Palanisamy . |
| 5,049,804 | 9/1991 | Hutchings . |
| 5,140,252 | 8/1992 | Kizu et al. ............... 320/39 |
| 5,160,880 | 11/1992 | Palanisamy . |
| 5,166,623 | 11/1992 | Ganio . |
| 5,172,044 | 12/1992 | Sasaki et al. . |
| 5,179,335 | 1/1993 | Nor . |
| 5,192,905 | 3/1993 | Karlin et al. . |
| 5,198,743 | 3/1993 | McClure et al. . |
| 5,202,617 | 4/1993 | Nor . |
| 5,204,611 | 4/1993 | Nor et al. . |
| 5,206,578 | 4/1993 | Nor . |
| 5,206,579 | 4/1993 | Kawate et al. . |
| 5,233,284 | 8/1993 | Mattsson . |
| 5,307,000 | 4/1994 | Podrazhansky et al. . |
| 5,329,218 | 7/1994 | Rydborn .................. 320/21 |
| 5,367,244 | 11/1994 | Rose et al. ............... 320/23 |

Primary Examiner—Peter S. Wong
Assistant Examiner—Patrick B. Law
Attorney, Agent, or Firm—Leydig, Voit & Mayer, Ltd.

[57] ABSTRACT

Apparatus and method for charging a battery, wherein a target voltage is applied to a battery. During charging, the applied voltage is periodically increased and decreased a predetermined amount to modify the applied voltage by a small step in either direction. The charging input is measured as the current flow to the battery at each of the applied levels, and the target charging voltage is adjusted in the direction of the improved charge acceptance as indicated by the differentials of the input current flow at the increased and decreased levels. By repeating the process, the charging voltage is continually moved in the direction of an optimized charge acceptance level. Alternatively, a target current is applied and increased and decreased by a small step and adjusted in the direction of the improved charge acceptance, which corresponds to the differentials of the resulting voltages at the increased and decreased levels.

21 Claims, 14 Drawing Sheets

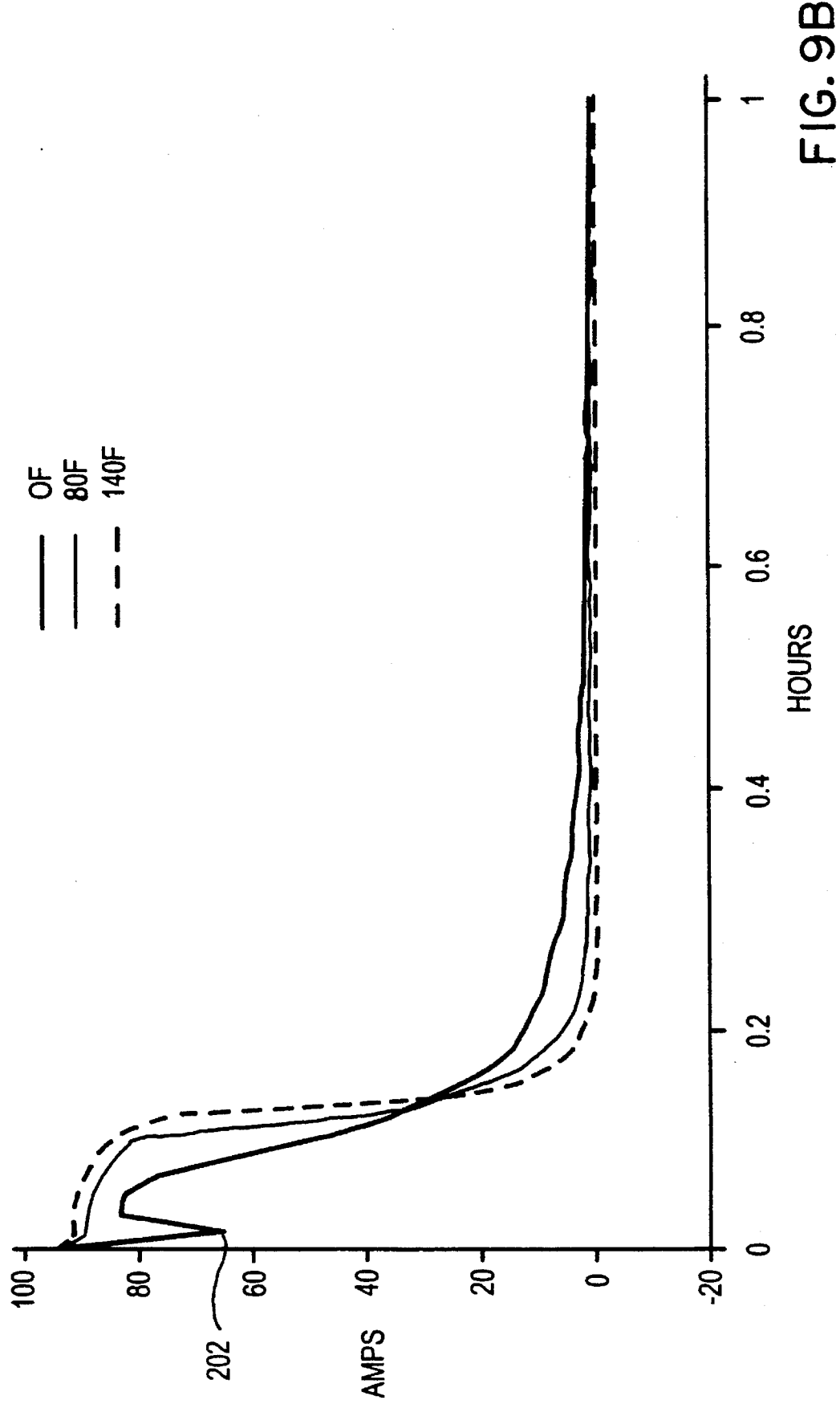

APPARATUS AND METHOD FOR STEP-CHARGING BATTERIES TO OPTIMIZE CHARGE ACCEPTANCE

FIELD OF THE INVENTION

The invention relates generally to the field of batteries, and more particularly to an apparatus and method for rapidly and efficiently charging batteries.

BACKGROUND OF THE INVENTION

Rechargeable batteries are increasingly becoming an important source of clean portable power in a wide variety of electrical applications, including use in automobiles, boats and electric vehicles. In particular, the lead-acid battery, while an old technology, continues to constitute a substantial portion of the rechargeable batteries being produced. While not particularly energy efficient because of the inherent weight of lead with respect to other metals, lead-acid batteries still retain the advantage of being very power efficient while being among the cheapest, most reliable and most readily producible rechargeable batteries. Thus, lead-acid batteries are typically used to start engines, propel vehicles such as golf carts, and to act as non-interruptable sources of back-up power when an external supply of electricity is interrupted.

The ability of the lead-acid battery to deliver large amounts of electrical power is well known, particularly when associated with the starting of motor vehicles. Likewise, the need to recharge these batteries and the problems associated therewith are also well known.

Many limitations and faults found in lead-acid batteries and other types of batteries are the result of poor recharging control. For example, overcharging of a battery wastes energy, reduces the product life, and may permanently damage the battery. In addition, overcharging can accelerate grid corrosion, increase the specific gravity of the electrolyte by dissociating water into its component gasses, and generate undue heat that tends to amplify and accelerate other problems.

On the other hand, undercharging the battery limits its capacity and likewise leads to degradation of the battery that is often unrecoverable. Undercharging is known to cause stratification of the electrolyte (particularly in flooded batteries), uneven use of the active materials, and may even lead to permanent sulfation of the active materials.

As defined in a reference text entitled "Lead-Acid Batteries," by Hans Bode, (copyright 1977 by J. Wiley and Sons), the capability of a cell or battery to store the charging current so that it can be redischarged is called the charge acceptance. The charge efficiency is further defined as the current input actually charging the battery divided by the total input current. Thus, the current flowing into a battery is either used to charge the battery, i.e., the charge acceptance, or must be dissipated, which primarily occurs in side chemical reactions such as gassing. Thus, an idealized instantaneous charge acceptance of a battery is a charging current at which all of the available soluble discharge product, i.e., lead sulfate ($PbSO_4$) for a lead-acid battery, is being charged without undue gas generation. In other words, it is the maximum amount of charging input current that can flow into the battery while still maintaining an acceptable (minimum) amount of gas generation. Note that since the amount of gas generation that is acceptable to a particular application varies depending on a number of user-determined factors, there is no actual ideal charge acceptance, only a current that most efficiently charges the battery while maintaining an acceptable amount of gas generation.

To recharge a battery in accordance with its optimized charging requirements ordinarily requires consideration of a large number of factors and compensation therefor. For example, a number of factors such as the intended use of the battery, its age and history, and in particular the internal temperature of the battery, influence the ideal charging requirements. Other factors that are ordinarily considered include the type of battery (such as maintenance free or user maintained), the size of the battery, the rate of discharge, the stand time of the battery since discharge, composition of the battery and the presence or absence of chemical species or impurities that may affect gassing or hinder the solubility of lead sulfate. Finally, safety must always be considered since fire, fuming, explosion, or thermal runaway may occur as a result of uncontrolled excessive overcharging.

In addition, consideration must be given to whether the charging apparatus is intended to be a stand-alone unit or must be capable of functioning in a vehicle charging apparatus. More particularly, in a vehicle, the charging may be taking place alternatively as the battery may be called on to deliver power under a wide range of circumstances.

As a result of these and other potential charging considerations, the methods of charging lead-acid (and other) batteries have traditionally fallen into two primary categories. The first category consists of a constant current apparatus and method which applies an arbitrarily low current to a discharged battery until it is fully recharged, typically taking ten-to-twenty hours. The current value is purposely set low so that it will not harm the battery at the end of the charging period. Particularly when dealing with flooded batteries, this charging technique is frequently supplemented with an excess of charge which destratifies the electrolyte with gasses produced from the electrolysis of water.

However, in addition to taking a considerable amount of time to recharge, if the level of discharge prior to recharging is not initially known, the time and amount of current necessary to properly recharge the battery will be difficult to establish and the battery must therefore be monitored to prevent undercharge or excess overcharge. Numerous prior techniques have attempted to measure the point at which to terminate this type of time-inefficient charging, but all suffer from the same inherent problem, i.e., having constant current charging does not match the variable battery charge acceptance requirements throughout the recharging process.

The second category of charging methods and apparatuses are those which are based on a constant or fixed voltage output. Chargers having this capability are usually set to a maximum initial current output, which remains at that level until the voltage of the battery rises to that of the charger, whereby the current tapers gradually to a low end value. A full charge is indicated by a low, steady current. These chargers are typically left on until the battery is needed for use or when a maximum time limit has been reached.

Because of the low amount of current at the end of the charging cycle and the low overcharge at typically conservative recharge voltages, with this type of apparatus a deeply discharged flooded battery often will have a stratified electrolyte even when full recharge is obtained, limiting battery performance and life. Increasing the voltage level in order to achieve more gassing or agitation and mixing is dangerous and difficult to accomplish without severely overcharging the battery if applied for too long of a period of time and possibly leads to thermal runaway. Other problems that arise with this type of charger include high battery temperatures and impurities that significantly influence the amount of charging current flowing to the battery at a fixed voltage. Accordingly, numerous techniques have been developed for constant voltage chargers that attempt to determine temperature compensation and the point of termination of charge, but again fail to match the optimal charge acceptance needs at any given moment.

Hybrid combinations of both of these charging methods with various timing mechanisms still suffer from the basic limitations imposed by these types of chargers, that is, they arbitrarily set the parameters for battery charging which restricts the conditions under which they work. In other words, the charging mechanism, not the battery itself, dictates the amount of charge supplied.

As a result of these and other well-known charger control problems, long periods of recharge at low rates of charging, known as trickle charging, have historically been used for lead-acid batteries, and are still common. However, with this recharging method the battery is tied up for long periods of time, thus greatly reducing the amount of time available for utilizing the battery. This is particularly unacceptable in applications where short recharge times are almost essential, such as with battery-based electric vehicles.

The need for a high rate of recharge is therefore paramount to efficient battery use in many applications. However, applying relatively high recharge currents, even for short periods of time, must be very carefully controlled, or will lead to excessive gassing, electrolyte spewing and increased heating that are both dangerous and can cause permanent battery damage and reduced life.

Most recently, microprocessor-based systems have been employed to control recharging techniques in various attempts at adjusting battery chargers to the changing conditions of the battery during charging. To function, however, these systems require extensive data calculations and suppositions for many battery conditions. For example, probing cycles are regularly made by such systems during charging in order to calculate a more ideal current or voltage charging level. However, these probing cycles (to determine improvements to charging conditions) tend to be lengthy in order to obtain useful data and are normally performed at a less-than-optimal charge. Thus, such systems cannot achieve the level of control required on the instantaneous basis that is required during high rates of charging. Moreover, frequent probing cycles can even lead to reduced control and efficiency.

The ability of a charging technique that inherently compensates and adjusts for such factors as the type of battery, temperature, previous discharge rate, stand time, state of charge and other such factors will lead to a very efficient battery charger and improved battery life. In spite of numerous prior attempts to determine an optimized electrical charging output required to match the charge acceptance needs of a recharging battery, no simple, reliable, rapid, and safe way to provide a variable recharging signal as dictated by the charge acceptance of the battery throughout the charging cycle is currently available.

Accordingly, it is a primary object of the present invention to provide a method and apparatus for charging a battery that regularly adjusts its electrical charging output to approach a more optimized level of charge acceptance of the battery.

It is a related object to provide a battery charger that inherently compensates for factors influencing charge acceptance requirements.

Another object of the invention is to provide a simple and efficient method and apparatus for charging a battery that automatically adjusts to determine an optimized recharging current and voltage profile for the battery based on the requirements of that specific battery and the output capacity of the charger.

An additional object is to provide a battery charger that is capable of efficiently and safely charging batteries of various types and sizes while controlling the amount of gassing.

Still another object is to provide a simple and reliable battery charger that can be combined with other charging techniques for handling diverse conditions and controlling the phases of a charging operation.

SUMMARY OF THE INVENTION

Briefly, the present invention provides a method and apparatus for charging batteries including a controllable power source providing an electrical charging output at variable current or voltage levels. The battery is connected at the power source to its terminals. The charger includes control circuitry for controlling the power source to apply the electrical charging output to the battery at a target output level, and to periodically apply the electrical charging output to the battery at an increased output level above the target output level and at a decreased output level below the target output level. A sensor measures the charging input to the battery at the target, increased and decreased output levels and comparison circuitry responsive to the sensor determines the differences of the charging input at the corresponding increased and decreased output levels. The target output level is then increased or decreased in accordance with the determination.

Thus, the control circuitry executes a software routine that continually attempts to adjust the electrical charging output of the power supply to optimize the charge acceptance of the battery. The preferred charger accomplishes this by continually adjusting its output level, via small discrete steps, in the direction that corresponds to an improved level of charge acceptance, as indicated by a minimized charging input differential, until the battery is charged.

Other objects and advantages will become apparent from the following detailed description when taken in conjunction with drawings, in which:

BRIEF DESCRIPTION OF THE DRAWINGS

FIGS. 5, 6A–6B, 7, 8, 9A–C, 10 and 11 are graphical representations of the charging profiles for selected batteries at various charging conditions and having various histories.

Figure 1:
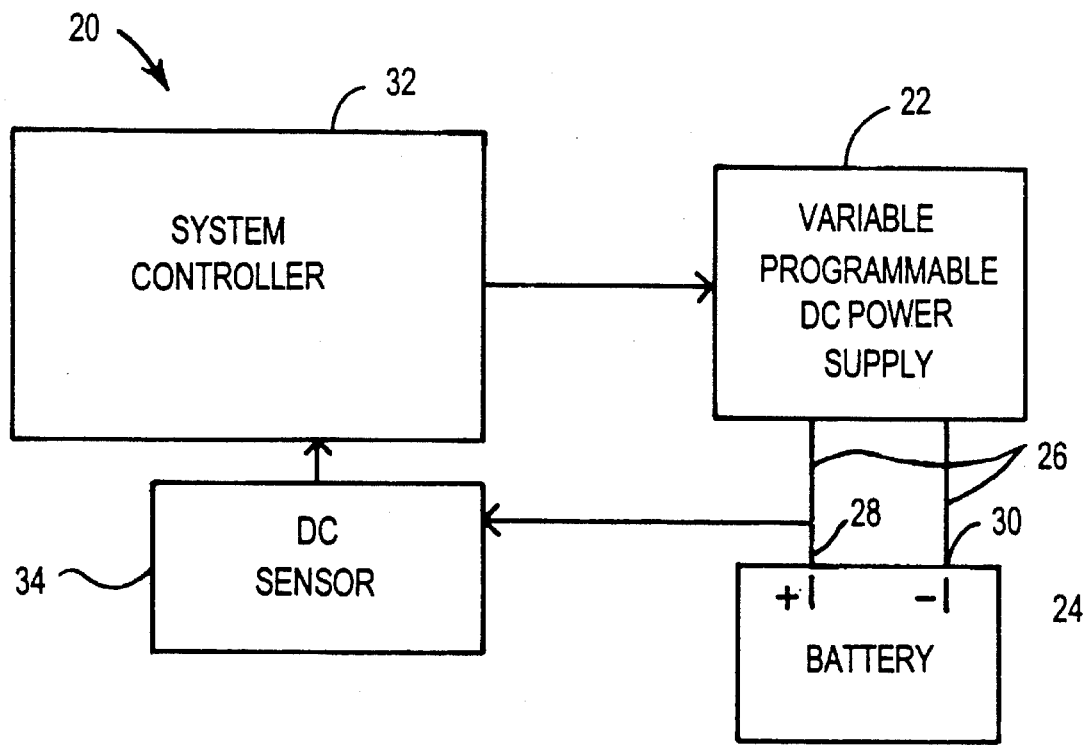
FIG. 1 is a block diagram of a generalized battery charging system embodying the present invention.

While the invention is susceptible to various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Referring first to FIG. 1, there is shown a block diagram of a battery charging apparatus, or system, generally designated 20, according to the present invention, including a variable output power supply 22 connected in a conventional manner to a battery 24 for charging. To this end, the charging system 20 includes conductors 26 as a means for connecting the power source to charging terminals 28, 30 of the battery. Depending on the amount of charge to be conveyed therethrough, the conductors 26 may comprise heavy-gauge copper wires or cabling.

Central to the charging system 20 is a system controller 32 having control circuitry therein for regulating the output of the power supply 22. Accordingly, the current and/or voltage supplied by the power supply 22 is ultimately determined at the system controller 32. A DC sensor 34 measures the charging input to the battery and returns at least one value to the system controller 32 indicative thereof. Typically the returned values represent the current flowing into the battery and/or the voltage across its terminals 28, 30.

Figure 2:
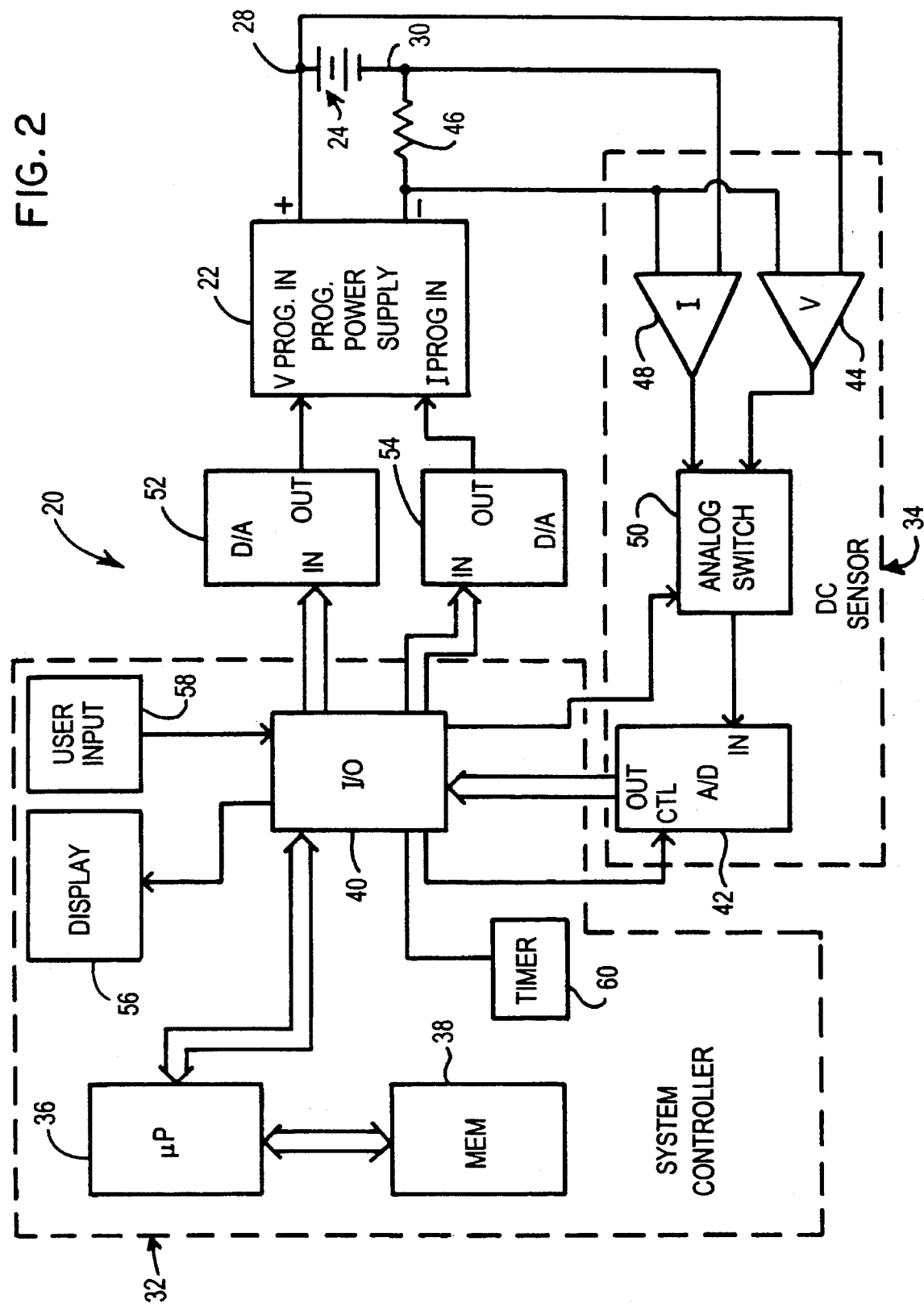
FIG. 2 is a block diagram of a more detailed apparatus for charging a battery according to the invention.

Preferably, as shown in more detail in FIG. 2, the system controller 32 includes a microprocessor 36, a memory 38, and input/output (I/O) circuitry 40 connected in a conventional manner. The memory 38 is intended to include random access memory (RAM), read-only memory (ROM) and the like. Conventional circuitry for latching output signals from the microprocessor 36 is ordinarily included in the I/O circuitry 40 where appropriate.

The power supply 22 is of a type capable of providing an electrical charging output at either a variable voltage level or a variable current level (or both) in accordance with commands received from the system controller 32. The commands controlling the power supply output may be in the form of digital signals, in which case digital-to-analog voltage conversion or its equivalent must take place. To this end, the charging apparatus 20 includes digital-to-analog voltage converters 52, 54. Accordingly, analog control voltages are provided thereby to control the power supply 22 via digital values output by the microprocessor 36.

It can be readily appreciated that although most programmable power supplies are configured to interpret such analog voltage levels, typically 0–5 volts, in order to set their voltage and current outputs, the digital-to-analog voltage converters 52, 54 may be internal to the power supply 22, thus requiring a direct digital input thereto. In either case, the voltage and current to be applied to the battery are controlled by commands ultimately originating in the microprocessor 36. For example, the microprocessor will generally set the current to the maximum capability of the power supply and then control the voltage. Of course, for certain batteries where a maximum charging current level is known, for safety reasons the current is limited so as to be less than or equal to this maximum level. Thus, any suitable controllable power supply with fast response times to commands and a stable output, and having the desired voltage and current output capabilities (as dictated by the requirements of the battery to be charged, the time allowed, and the desired cost and electrical requirements of the power supply) will suffice for purposes of the invention. Switching power supplies are preferred, however SCR type supplies may also be adapted.

For reading the values indicative of the charging input, an analog-to-digital voltage converter 42 is provided. The voltage is read across the battery terminals 28, 30 and is attenuated by voltage attenuator 44 so as to match the input range of the analog-to-digital voltage converter 42 with the applied battery charging voltage. In addition, an offset voltage may be factored in such that the lowest reasonable voltage level in the battery charging voltage range corresponds to a certain (floor) level at the input of the analog-to-digital voltage converter 42. For example, an analog-to-digital voltage converter 42 having a 0–10 volt input voltage range would use its full range over an 8–20 volt charging level if first 8 volts was subtracted from the charging voltage, (via an operational amplifier configured as an adder circuit or the like, not shown), and the level was attenuated by a factor of 83.33%, (i.e., 10/12). Of course, with lower voltage batteries that are charged with less than the maximum analog-to-digital voltage converter input voltage, the voltage can alternatively be amplified (rather than attenuated) for this purpose.

Similarly, the current flow into the battery, directly indicative of the charging input thereto, is read across a resistor 46 and is ordinarily amplified by a current amplifier 48 (actually a differential voltage amplifier) so as to match the input range of the analog-to-digital voltage converter 42. An analog switch 50, under the control of the microprocessor 36 is provided so that a single analog-to-digital voltage converter 42 obtains both current and voltage measurements.

The preferred system controller 32 includes the analog-to-digital voltage converter 42 therein for converting the current and voltage measurements supplied by the DC sensor 32 to digital values. One integrated circuit, a Zilog Z86C30 microcontroller has been identified as being particularly useful as a component within the system controller 32, as it provides a microprocessor, RAM, ROM, and timer/counter capabilities in a single package. In addition, the Z86C30 has analog-to-digital voltage conversion capabilities by way of analog voltage comparators therein, provided a known variable reference voltage (for example, a voltage ramped at a known rate between a lower and upper limit) is made available for comparing against the input voltage.

Nevertheless, it can be readily appreciated that any number of equivalent system controllers can be developed from other digital and analog circuitry components to perform the desired control functions as described in more detail below. Indeed, one such charging apparatus 20 has been implemented comprising a 386DX20 personal computer as the system controller 32 executing instructions originally written in the BASIC programming language (for example, Microsoft QuickBASIC version 4.5), to control a Hewlett-Packard HP6031A programmable switching power supply via an IEE488 interface. However, while not necessary to the invention, it can be readily appreciated that it is ordinarily preferable to employ dedicated circuitry as the system controller 32 and power supply 22 for use in more commercial applications such as in vehicle-based charging systems or stand-alone battery charging devices.

According to the invention, the system controller 32 executes a software routine that continually attempts to adjust the charging output of the power supply 22 to optimize the charge acceptance of the battery. As described in more detail below, the preferred charger accomplishes this by continually adjusting its output voltage, via small discrete steps, in the direction that corresponds to an improved level of charge acceptance.

Although the power supply 22 may be configured as a variable voltage source or alternatively as a variable current source, unless otherwise noted, for simplicity herein the power supply 22 will be described as a variable output voltage source having its voltage output level controlled by the system controller 32, with its current output set to a level so as to provide sufficient current to the selected battery to achieve recharge in a desired time period. Moreover, while the invention is primarily described with respect to the charging of lead-acid batteries, there is no intention to limit the invention to any particular type of battery. On the contrary, the invention is specifically intended to be used with all types of batteries capable of accepting an external charge, including, but not limited to, all types of lead-acid type batteries, nickel-cadmium batteries, and alkaline batteries.

Although not necessary to the invention, if desired, the system 20 may first check for a shorted battery or other unusual condition such as an improper battery-to-charger connection before attempting the charging procedure. To this end, well-established techniques may be added to the software routine to be executed as part of an initialization procedure. If further desired, the system controller 32 may generate a warning signal, alarm or the like indicating a fault condition. Depending on the application, a display 56 or the like may be operatively connected to the I/O circuitry 40 to provide visual information. Moreover, a software routine to discharge the battery a predetermined amount before commencing the charging process may be further incorporated, which has been found useful with certain battery technologies such as nickel-cadmium batteries to eliminate memory effects.

For example, an initialization routine may include steps such as initializing a timer 60, establishing a maximum current level setting for the power supply, and/or obtaining the battery's open circuit voltage. Other preparation techniques may also be performed at this time. In addition, any user-set charging variables, such as establishing a maximum safe voltage level, may be input from a user input device 58 such as a keyboard or switchboard during this initialization procedure.

Figure 3A:
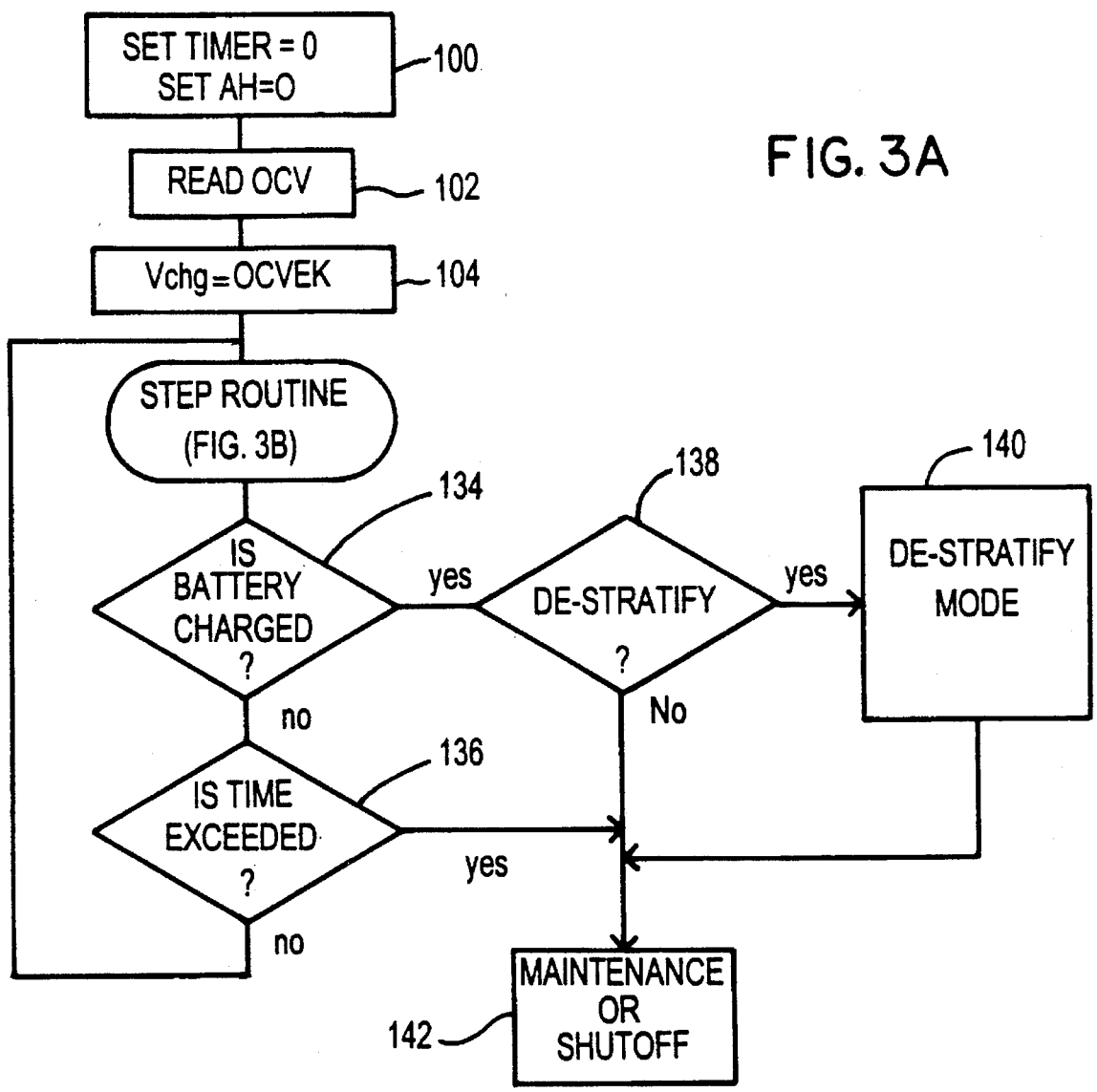
FIGS. 3A–3B comprise a flowchart representing the steps involved in charging the battery according to the present invention.
Figure 3B:
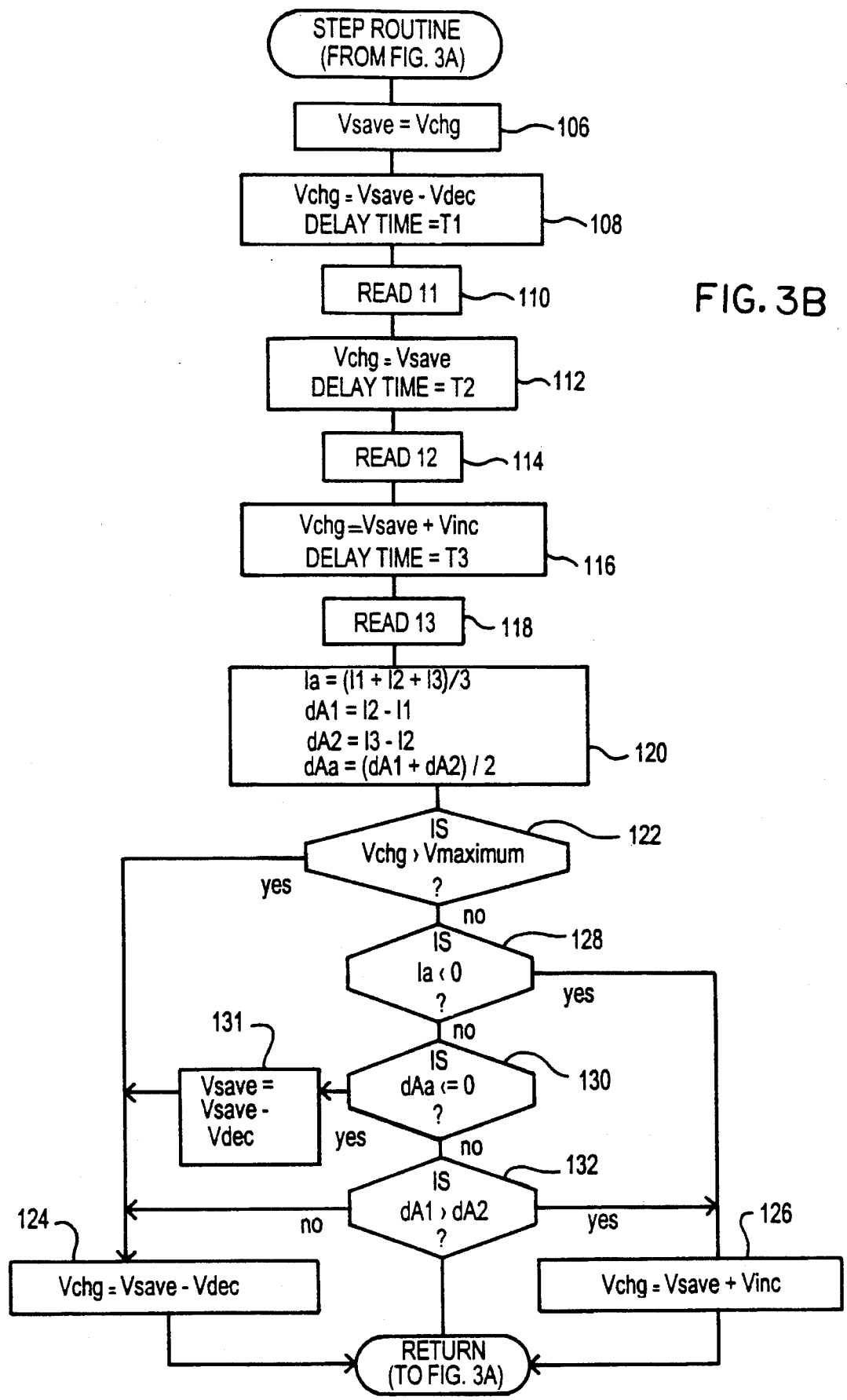

As represented in the flowchart of FIGS. 3A and 3B, the exemplified charging routine begins with such an initialization routine including steps 100–104. In step 100, the microprocessor resets the timer 60 in the system controller 32 to zero. This may be done in any number of ways, for example by reading a real time clock value and using this time value as the zero point, or by resetting a dedicated counter. Additionally, a variable AH, indicative of the battery recharge in ampere-hours, is zeroed.

Once any desired initialization steps are completed, and the battery is otherwise deemed acceptable for charging, the step-charging procedure is begun according to the invention. In operation, the charging system begins to function when the system controller 32 directs the variable power supply 22 to initially apply an electrical charging output to the battery 24.

Thus, at step 102, the battery open circuit voltage (OCV) is read by controlling the analog switch 50 such that the analog-to-digital voltage converter 42 receives the voltage across the battery terminals, and then triggering the analog-to-digital voltage converter 42 to obtain a reading. As previously discussed, this voltage is ordinarily attenuated such that the analog-to-digital voltage converter 42 generally uses its full range to read the various charging voltages. Once obtained, an initial target charging voltage, $V_{chg}$, is established at step 104 as the OCV plus a constant K. For example, for a battery having an OCV of 12 volts, the target charging voltage may be initially set to 14 volts by having K equal 2 volts. The actual value of K is ordinarily selected to correspond with the capabilities of the power supply and with respect to the type of battery being recharged. For example, K can been set to 1.5 volts for a 100 ampere power supply charging a 12 volt battery. However, the constant K is ordinarily chosen as merely a desirable guess so as to initially start the charger at a voltage level that is reasonably close to the voltage level that the software routine will move the charger output towards, regardless of the starting level. Indeed, no specific starting voltage level is necessary, (as long as reasonable), and thus K may be zero, or even negative.

At this time, the system is prepared to begin charging the battery. Thus, at step 104 the system controller 32 directs the power supply to apply the initial target voltage $V_{chg}$ (equal to OCV+K) to the battery, while at step 106 (FIG. 3B) the executing program enters the step-charging routine and records the value of the target charging voltage, $V_{chg}$, as a variable in the memory 36, herein identified as $V_{save}$.

In accordance with one aspect of the invention, at step 108 the level of the charging voltage is lowered by a small step to a decreased output level. Thus, a new charging voltage is applied to the battery which equals the previous voltage $V_{save}$ minus a small predetermined value, $V_{dec}$, i.e., $V_{chg}$ is lowered by a predetermined amount. After a predetermined delay time, $T_1$, which allows the applied voltage and current to settle to a relatively flat level as described in more detail below, the charging input to the battery, as indicated by the current flow into the battery is measured and set equal to $I_1$ at step 110. To accomplish the measurement, the microprocessor 36 controls the analog switch 50 such that the analog-to-digital voltage converter 42 reads the voltage across resistor 46, and then triggers the analog-to-digital voltage conversion. Resistor 46 is ordinarily a precision resistor having a resistance value chosen in dependence on the maximum level of current that is anticipated as flowing therethrough, so that the current flow therethrough results in a suitable voltage. For example, very low resistance values, in the range of 0.1 to 1 milliohms, are chosen for chargers arranged to output 100–300 amperes. This gives a suitable voltage for measuring without unduly heating the resistor.

As previously discussed, this voltage representing the current flow into the battery is ordinarily amplified such that the full range of the analog-to-digital voltage converter 42 generally corresponds to the full range of possible currents. At this time, the charging input level $I_1$ of the battery is determined for a decreased charging voltage at a known level below the present target voltage level.

In keeping with the invention, at step 112, by stepping the voltage back up, ($V_{chg}=V_{save}$), the charging input 12 (via the current flow) is again measured after a suitable delay time $T_2$. Similarly, at step 116 the level of the charging voltage is increased by a small step $V_{inc}$ to an increased output level. That is, a new, increased charging voltage is applied to the battery, i.e., $V_{chg}$ equals the previous voltage $V_{save}$ plus a small predetermined value, $V_{inc}$. After a predetermined delay time $T_3$, the charging input to the battery at the increased voltage level is measured and set equal to $I_3$ at step 118.

Although it may be possible to read the current values at the decreased, target and increased voltage levels in any order, it has been found that for rapid measurements more consistency is obtained by adjusting the voltages in the same direction, preferably upwardly from the decreased level to the target level to the increased level. Due to the capacitance of the battery, changes in the voltage cause the input current to move relatively substantially before settling after a brief time. Thus, both by delaying until the current substantially plateaus and ensuring that the current stabilizes in the same direction, (i.e., exponentially downward after any increase in voltage), the measurement is more consistent since the measured currents are all at substantially the same points in their approximate plateaus.

In any case, at this time the values $I_1$–$I_3$ have been obtained, and thus the charging input to the battery is known at the target level ($I_2$) and at the increased and decreased levels slightly above ($I_3$) and below ($I_1$) the target level. Based on these values, in keeping with the invention the microprocessor 36 executes a number of calculations at step 120 which determine the direction to adjust the target voltage.

Thus, at step 120 an average charging input (current flow) $I_a$ is obtained, along with two charging input differentials $dA_1$ and $dA_2$ which indicate the change in the charging input at the decreased voltage level and at the increased voltage level, respectively, from the charging input at the target voltage level. Finally, the average differential, $dA_a$, is calculated.

In accordance with the invention, using these values the system controller 32 makes a number of decisions as to the direction to adjust the target charging voltage. First, at step 122, the charging voltage $V_{chg}$ is checked to make sure it is below the maximum allowable voltage, $V_{maximum}$, if any, that was previously input for this battery. If the charging voltage is above the maximum, at step 124 the target charging voltage is immediately decremented and the routine returns to determine if charging is completed as described in more detail below. Of course, the target charging voltage $V_{chg}$ could immediately be set equal to $V_{maximum}$, however this is unnecessary since the voltage will quickly reach this level as a result of repeated voltage decrementing as the loop is continually re-executed.

In the ordinary case, the charging voltage $V_{chg}$ will be below $V_{maximum}$, so that step 128 will usually be executed. This step checks to determine if the average current flow is into the battery 24, i.e., the battery 24 is not discharging into the power supply 22. If the average current flow is indeed negative, this indicates that the battery is at a higher voltage than the power supply, and thus the target charging voltage is increased by a predetermined amount at step 126. As can be appreciated from FIG. 3B, the incremental increase will repeatedly occur until the charging voltage is higher than the battery voltage and current flow is in the appropriate direction.

Once the average current flow is determined to be positive, at step 130 the average of the differentials, $d_a$ is checked. If this value is less than or equal to zero, a condition is present wherein the power supply is supplying its maximum current regardless of the applied voltage. In other words, the current differentials will be less than or equal zero since the current is not capable of moving with the voltage changes. Accordingly, in this condition the target charging voltage is lowered until the charging apparatus returns to voltage control.

However, lowering the target voltage only one step may still lead to current levels (and therefore measurements) that are being artificially limited by the power supply. Without taking this current limiting possibility into consideration, unrepresentative differential values may be obtained, causing the voltage to again be increased at step 126, thereby essentially failing to return the charger to voltage control. Thus, to ensure that the voltage is returned to voltage control, even if for only a single loop through the step routine, at step 131 the target voltage, $V_{save}$, is lowered by $V_{dec}$. At step 124, the voltage is again lowered again by $V_{dec}$. As a result, in this condition the subsequent target voltage is lowered by two steps rather than by one, which ensures that the current will not be limited by its maximum output setting for at least the next loop, i.e., the charger is temporarily returned to voltage control.

Finally, during the typical step-charging procedure wherein the extraordinary conditions are not present or have been eliminated as described above, at step 132 the system controller 32 compares the differentials to determine whether the increased voltage or decreased voltage results in a more optimal charge acceptance, as indicated by a lower current differential. Thus, if the lowered voltage resulted in the larger current differential, the charging voltage is increased by a small amount at step 126. Conversely, if the lowered voltage resulted in the smaller current differential, then the charging voltage is decreased by a small amount at step 124. Although not necessary to the invention, if the current differentials are equal, then the charging voltage is also decreased as a conservative measure. (Although the battery is primarily described herein as being charged by controlling the applied voltage, it should be noted that if the battery is alternatively being charged by controlling the current with a variable current source, the result of the differential comparison is exactly opposite, i.e., if a lower current results in a larger voltage differential, the charging current is decreased.)

According to the invention, the target charging voltage $V_{chg}$ is continually adjusted in the direction of the more optimal charge acceptance. The process repeats until ultimately the voltage approaches and stabilizes in a range that provides the optimal charge acceptance for that battery. Within this range, the step differentials are minimized. Any time that the optimal charge acceptance level begins to vary, for example as the internal battery temperature changes, the target charging voltage simply adjusts its direction to compensate.

This method thus inherently compensates for the various charging factors influencing the battery, because it essentially lets the condition of the battery itself determine the optimal direction to adjust the charging voltage. Moreover, occasional erroneous measurements that may result from noise and the like are insignificant, because the charging level is only adjusted incrementally at any one time and subsequent steps quickly bring the battery back to the proper charging level. Thus, a certain amount of system noise and uncertainty is tolerable as long as the system controller generally remains in control. As a result, critical data measurements are unnecessary, enabling the use of low cost components.

It must be emphasized that the process never actually determines an ideal charging voltage, only a direction to it. Accordingly, no complex calculations are necessary, only a decision as to whether to increase or decrease the charging voltage and the amount to adjust it.

Ordinarily, the amount that the target voltage is increased or decreased is equal to the amount of the stepped-up and stepped-down probing voltages, i.e., the voltage increment and decrement used for obtaining the current differentials is the same as the amount that the target voltage is increased or decreased once the direction is determined. While there is no reason that these levels must be the same, it is advantageous since the current flow used to determine the direction was obtained at that level. However, the magnitude of the adjustment should generally be the same as or lower than the magnitudes of the steps that are used to probe the charge acceptance.

Moreover, there is no reason that the size of the probing steps must remain constant throughout the charging process. For example, the magnitude of the steps can be tied to the level of current input, such as being set to a percentage thereof.

Although any voltage increase or decrease that is capable of providing a measurable change in current levels is sufficient, it has been found that a 0.0005 to 0.1 volt adjustment for a 12 volt battery is satisfactory, with 0.01 to 0.05 volts having been successfully used in several tests that have been conducted. In addition, it has been determined that a good initial charging value for 12 volt batteries is about 1.5 to 2.0 volts above the open circuit voltage, i.e., K=1.5 to 2.0 volts, but this is also a factor of charger size with respect to battery size.

Moreover, the delay times T1–T3 may be any value sufficient for the current to stabilize. It has been found that 0.2 seconds is sufficient for most switching power supplies. However, a balance that depends on the particular power supply being used must be achieved between the delay time and the amount that the voltage is increased and decreased. For example, the capacitance effects of the battery dominate the process if the delay is for too short of a time. Conversely, the optimized charge acceptance needs of the battery, which vary throughout the process, will change during too long of a delay time. It has been found that cycling the step-routine loop so as to adjust the level target charging voltage about once per second is a suitable rate. For example, at this rate if the adjustment to the target voltage level is 0.02 volts, it takes 50 seconds to achieve a 1 volt adjustment.

In addition, to favor one charge acceptance direction over another, and thus charge the battery at a slightly higher or slightly lower voltage than would ordinarily occur, these times may be varied. For example, since capacitance in the battery influences the settling time of the current, the sooner that the measurement is taken the higher the current level at the time of the measurement. Thus, to be more conservative and keep charging at the lower portion of the optimized charging region, the measurement can be biased in favor of decrementing the voltage by reading the current level at the increased level sooner, i.e., T1 and T2>T3. This can ensure the battery is being charged with a lower amount of gassing. Alternatively, this directional biasing can similarly occur by making the steps unequal, or by multiplying one of the differentials by a biasing factor.

As can be readily appreciated, numerous methods of providing the increased and decreased charging output levels are feasible. For example, rather than stepping-up the voltage in discrete increments, the voltage can alternatively be ramped between a decreased level and an increased level, with charging input measurements taken at least at the points on the ramp corresponding to the decreased, target and increased output. Also, rather than generating the output by a microprocessor, it is feasible to combine a time-varying signal with a DC charging output such that increased, decreased, and target levels are obtained. For example, sinusoidal, square-wave and sawtooth patterns can be impressed on a base DC voltage for modifying the applied level at a predetermined frequency between known levels, thus requiring that only the base voltage be directionally adjusted.

In addition, more than one discrete step in each direction can be used with this system, for example to not only determine the direction, but how much the charging output should be varied during that loop iteration, such as two steps up instead of one. Nevertheless, while equivalent to a single step, this complicates the calculations without providing any substantial benefit, since a single step in each direction adjusts the charging output quite sufficiently to achieve virtually the same result.

While it is convenient to measure only current differentials for steps of equal voltage, yet another way to decide on the direction to adjust the target voltage comprises obtaining relative differentials with respect to voltage changes, i.e., a slope of dI/dV. Voltage steps can thus be of unequal values, since the proper direction can be determined by factoring the slope dI/dV into the differential calculations.

Finally, as previously described, when using a single-step in each direction, the delay times and times between probing measurements may be varied, along with the amount of the increased and decreased probing outputs and target level adjustments.

Of course, to make an even more effective charging system, additional steps and routines may be added. For example, at step 134 the battery is checked to determine if it has been fully charged by determining if the average current flow has substantially stabilized over a specified time period. If so, an extra amount of charge can be added at that time to destratify the electrolyte, particularly when charging a flooded battery.

Accordingly, an optional mode that may be included is directed to destratifying the battery. At step 138, the decision as to whether to destratify the battery is made, for example based on a switch setting on the user-input 58. If destratifying is desired, at step 140 the system controller 32 controls the power supply 22 to provide an increased charging output level to the battery for a period of time. Generally the time and/or output level is based on the ampere hour capacity of the battery. For example, an excess charge of such as 15% of the capacity may be added.

Additionally, as indicated by step 136, a maximum safety time can be programmed into the system.

Once charging (including any overcharging to destratify) is complete, at step 142 the charger will then either be shut off, or programmed to enter a maintenance mode, which may comprise periodically turning the charger on to charge the battery, or maintaining the battery in a float condition with a reduced voltage. Ordinarily, this charged condition is detected by a substantially constant output level, i.e., the average current remains relatively flat. For example, a drop of less than 0.1 Ampere over 2 minutes has been successfully used as an indication of when a full charge condition has been reached.

Figure 4:
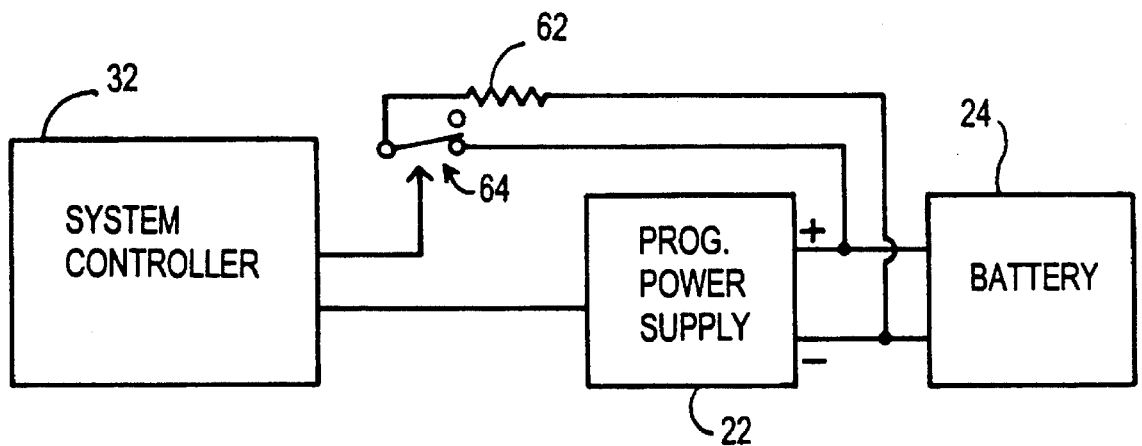
FIG. 4 is a block diagram of an optional resistor switching apparatus for achieving a better float condition.

During the float condition, if the average step current fluctuates into negative values, the power supply frequently has difficulty handling the transition from negative to positive current, resulting in a response higher than would otherwise be desirable in the float condition. As shown in FIG. 4, a resistor 62 added to the system will provide a means for the power supply to maintain a positive output, thus resulting in a lower average voltage and current necessary for a long-term float. During the float mode, the system controller 32 may control means 64 such as a relay, a switch or the like to automatically connect the resistor 62 across the terminals. Of course, the means 64 can also include any feasible way to manually connect the resistor.

The charging system described herein is feasible for use in both stand-alone chargers and in the dynamic vehicle environment. Since the step charging technique described herein is substantially instantaneous in its measurements and rapid in its adjustments, it adapts well to the wide-ranging conditions present in automotive charging. When incorporated into a vehicle the described controller can regulate an automobile alternator to adjust the charging voltage until the battery is charged, based on the charge acceptance needs of the battery and the variable output of the alternator. However, the system should be set to have an upper voltage limit determined by the other automotive components therein, with a reset to that limit after every battery discharge. Of course, the charging system would never be shut off during vehicle operation.

As can be seen from the foregoing, a method and apparatus have been provided for charging a battery that approaches an optimized level of charge acceptance by regularly adjusting its electrical charging output to the requirements of the battery. The disclosed battery charger inherently compensates for factors influencing charge acceptance requirements, and provides a simple and efficient method and apparatus for charging a battery that automatically adjusts to determine an optimized recharging current and voltage profile for the battery based on its requirements. The battery charger is capable of efficiently and safely charging batteries of various types and sizes while controlling the amount of gassing, and can be combined with other charging techniques for handling diverse conditions and controlling the various phases of a charging operation.

EXAMPLES

The following examples were obtained with the step-charging technique implemented in software instructions written in the BASIC programming language (Microsoft QuickBASIC 4.5) being executed on a 386DX20 personal computer. The computer was connected to a Hewlett-Packard HP6031A programmable switching power supply by an IEE488 interface. The starting voltage was the OCV+1.5 volts. A maximum of 18 volts was set, and the current was set to the maximum available based on the power supply limit of 1200 watts. (As seen in the following examples, this causes the current to initially taper down because the power supply cannot supply enough power.) The step voltage was 20 millivolts, with a timing delay after 0.2 seconds delay after each step. A bias of 0.7 times the delay for each previous step was used.

EXAMPLE 1

Figure 5:
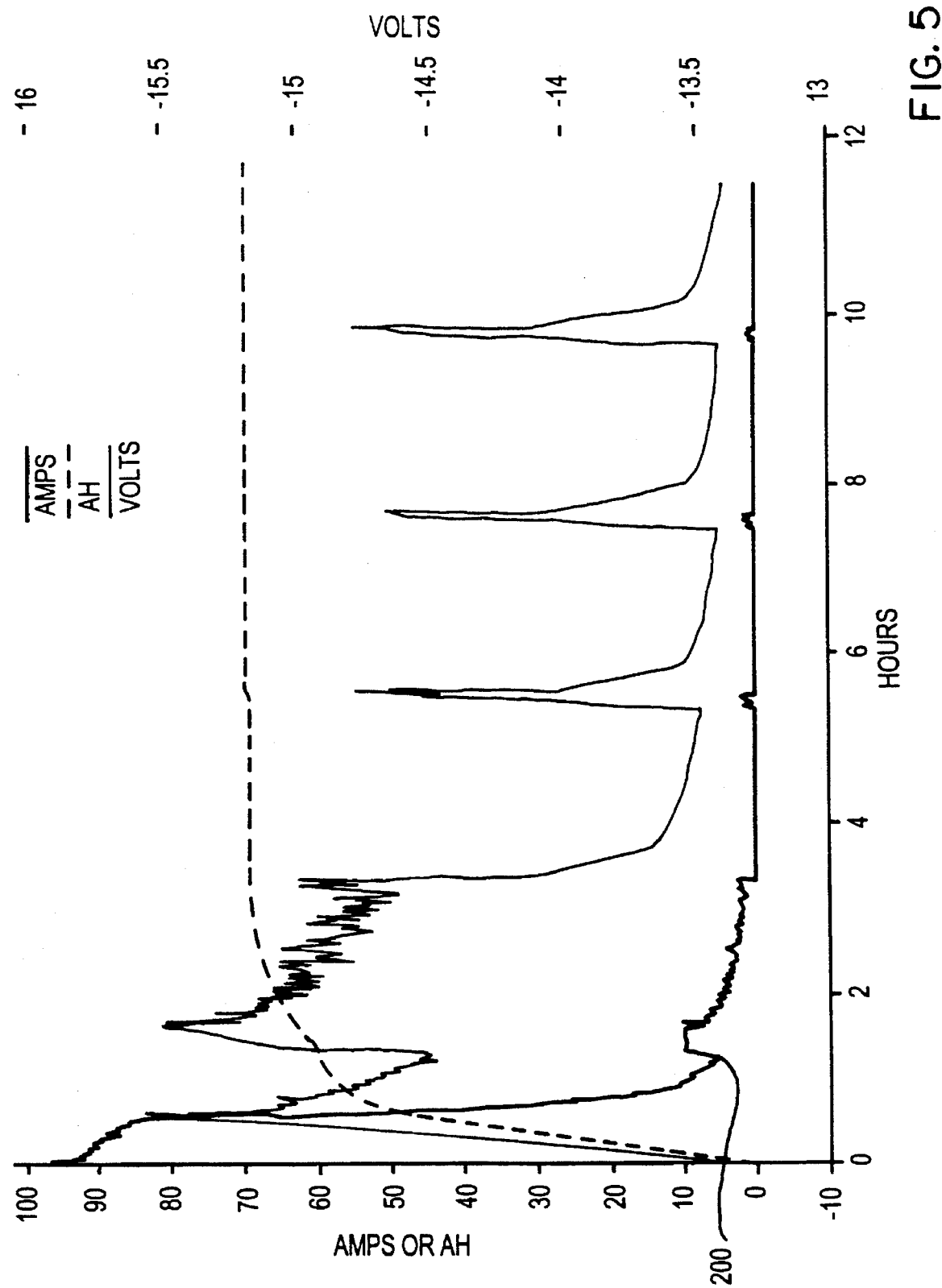

FIG. 5 illustrates the charging process employed to recharge a Gp27 (AP105) flooded deep-cycle battery with hybrid alloy construction. This type of battery is typically used in marine applications such as to power a trolling motor, and thus a quick recharge is desirable. In preparation, the battery was discharged at 25 amperes until a voltage of 10.5 volts was achieved, approximately 150.9 minutes.

As shown in FIG. 5, the battery was recharged to 100% of its discharged capacity in approximately one hour. As the average current stabilized, indicated by point 200 on the graph, a programmed overcharge period employing a timing bias favoring an increased voltage was added for several additional hours to increase gassing to destratify the battery electrolyte. During the overcharge, the current output was limited to a maximum of 10 amperes. This was followed by an indefinite maintenance period during which the charger was periodically turned on, as indicated by the voltage spikes.

EXAMPLE 2

Figure 6A:
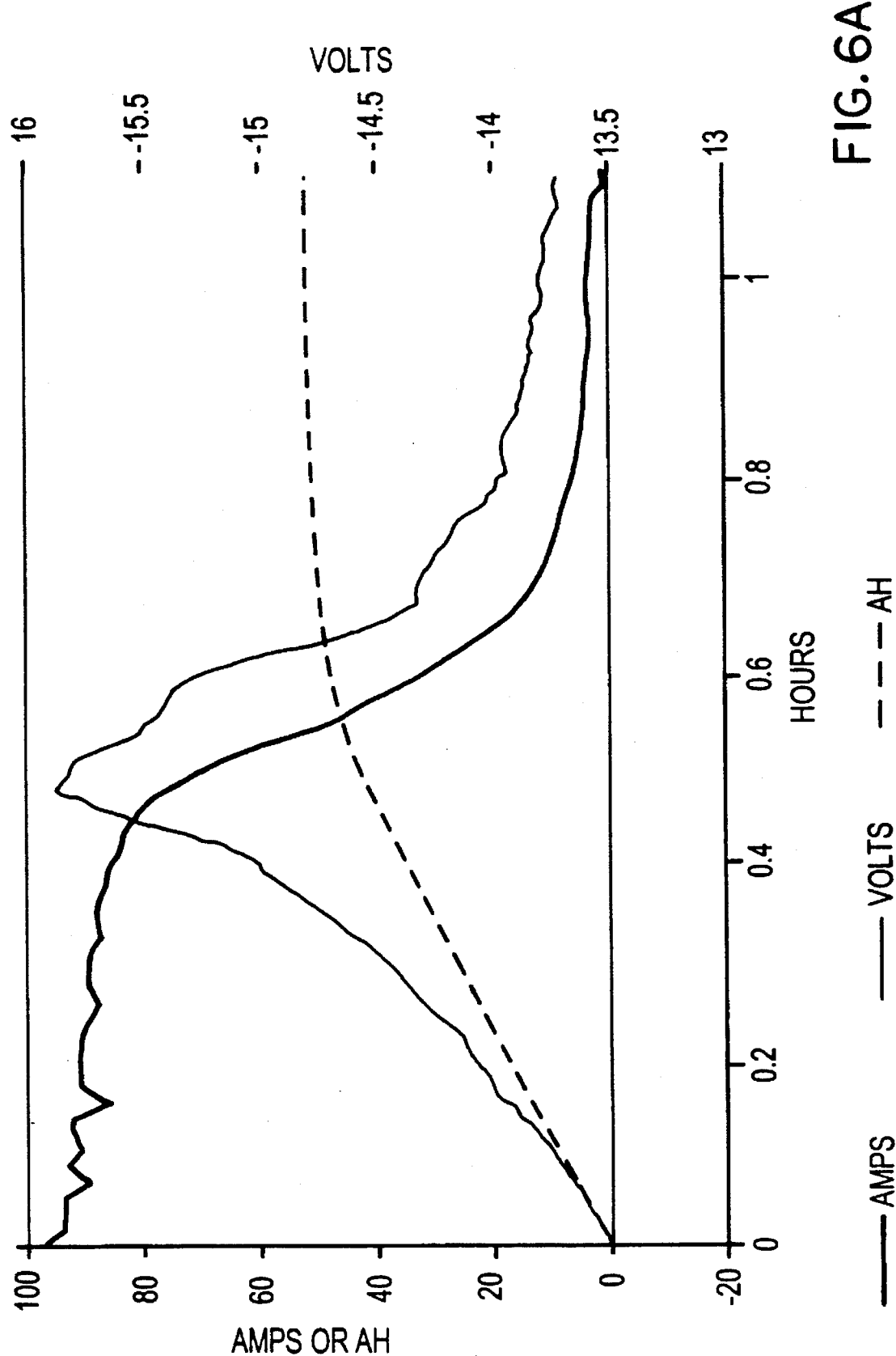

FIG. 6A illustrates the charging process employed to recharge a Gp27 VRLA recombinant battery, discharged in the same manner as the battery in example 1. As can be seen, the battery was quickly charged and automatically reduced to a low-end value to allow gas recombination without excess heating.

Figure 6B:
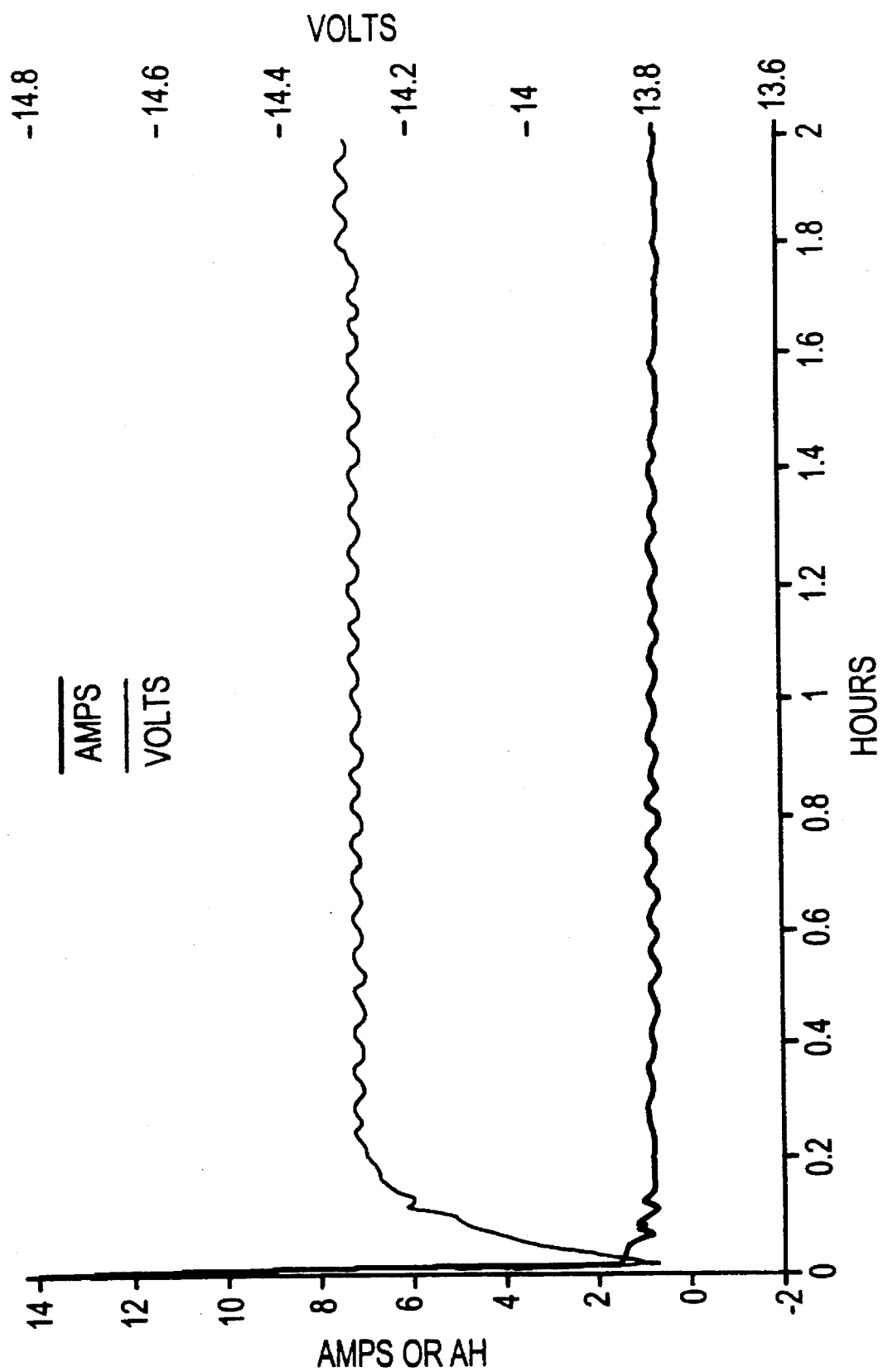

FIG. 6B illustrates the same type of battery as that used to create FIG. 6A, however in FIG. 6B the battery is connected to the step-charger when fully charged. As shown, the low steady current and voltage is quickly reached, eliminating any tendency towards thermal runaway.

EXAMPLE 3

Figure 7:
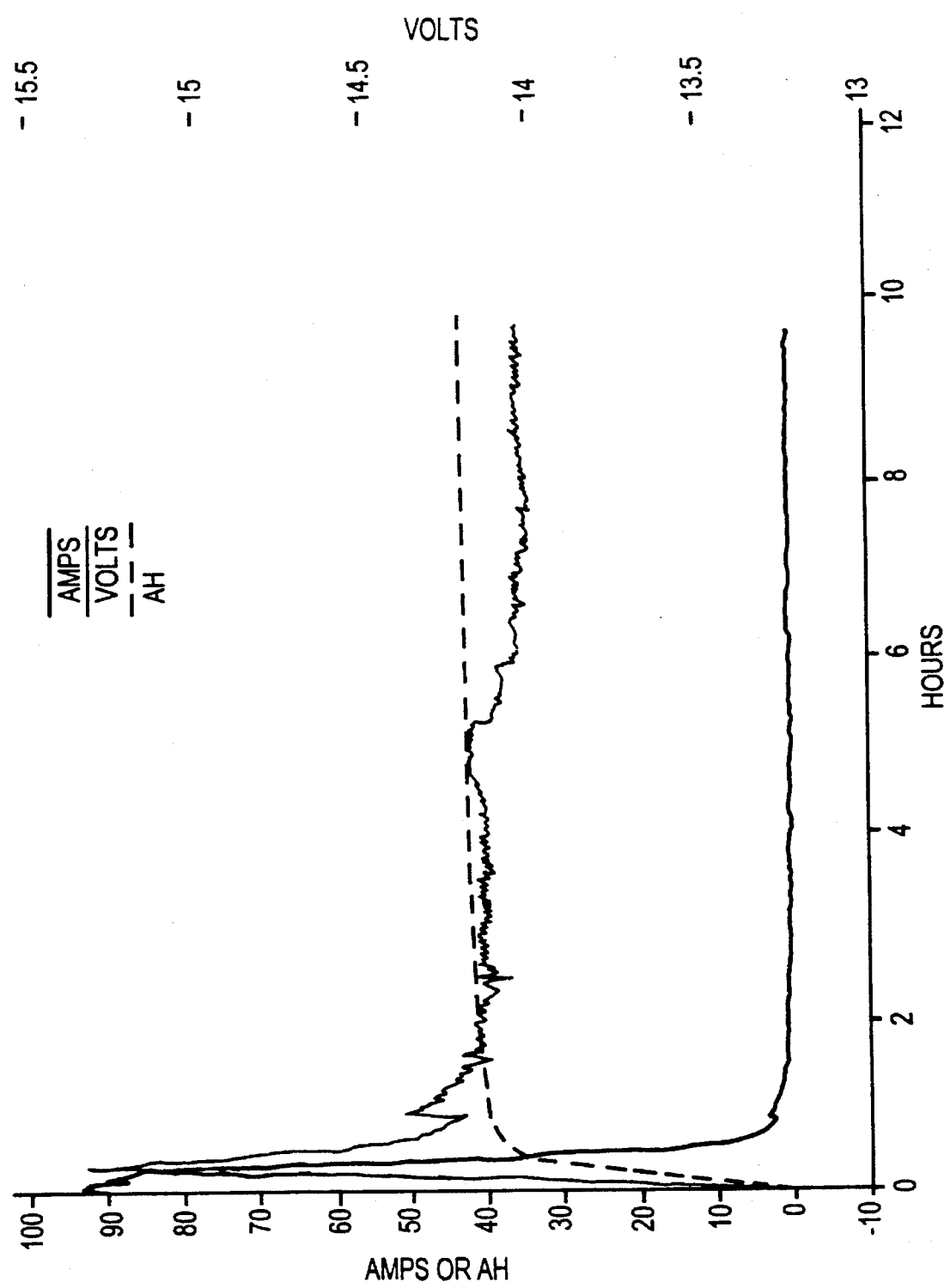

FIG. 7 illustrates the charging process employed to recharge a Gp2670 SLI maintenance-free (automotive) battery, discharged in the same manner as the battery in Example 1. The graph demonstrates that the step-charge system does not severely overcharge such a battery, which would tend to dry it out.

EXAMPLE 4

Figure 8:
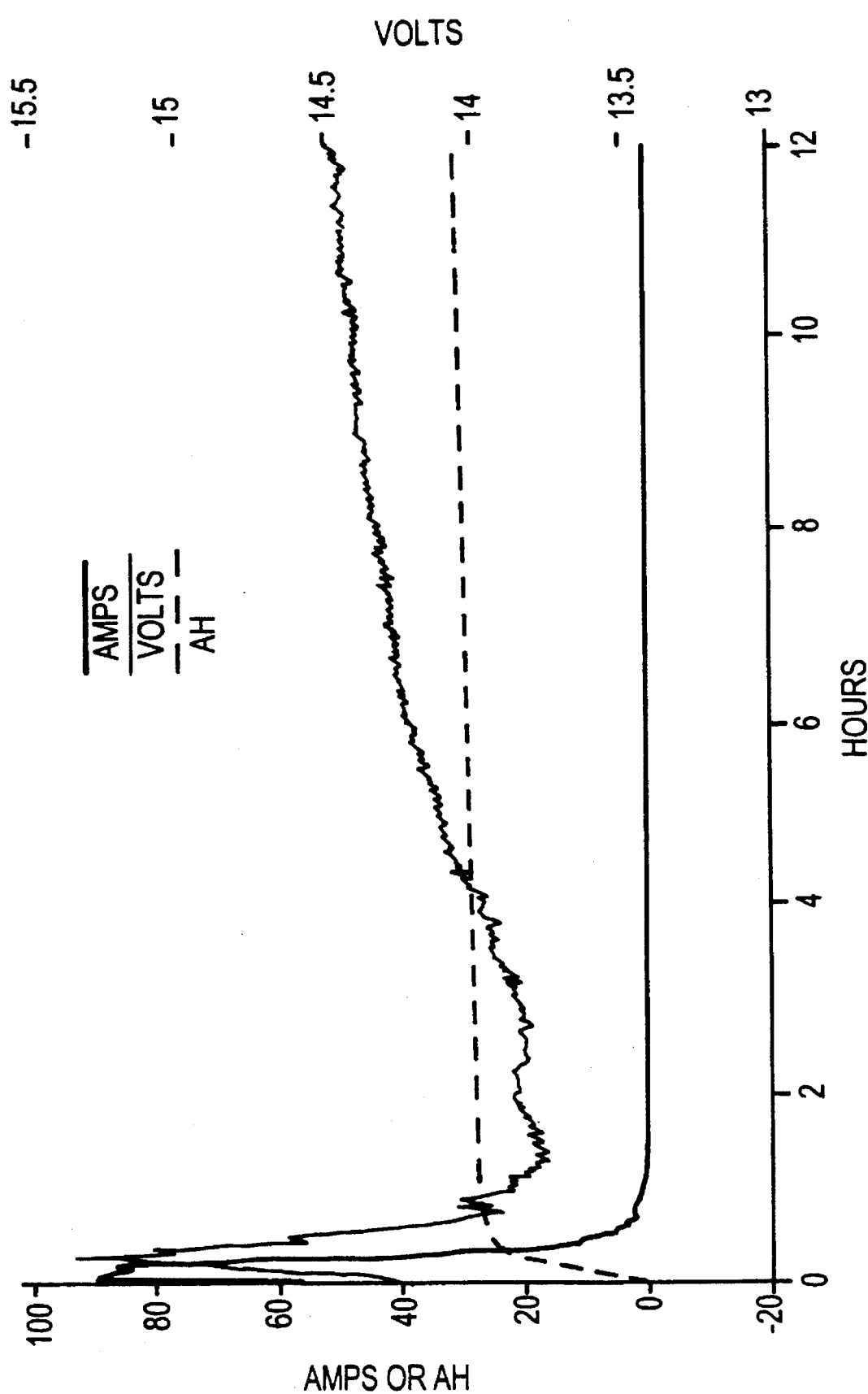

FIG. 8 illustrates the charging process employed to recharge a Gp40 battery having antimonial grid alloys in both the positive and negative electrodes. Again, the charger safely reduced the end voltage and current to very low levels, even with the added gassing effects of the antimony impurities.

EXAMPLE 5

Figure 9A:
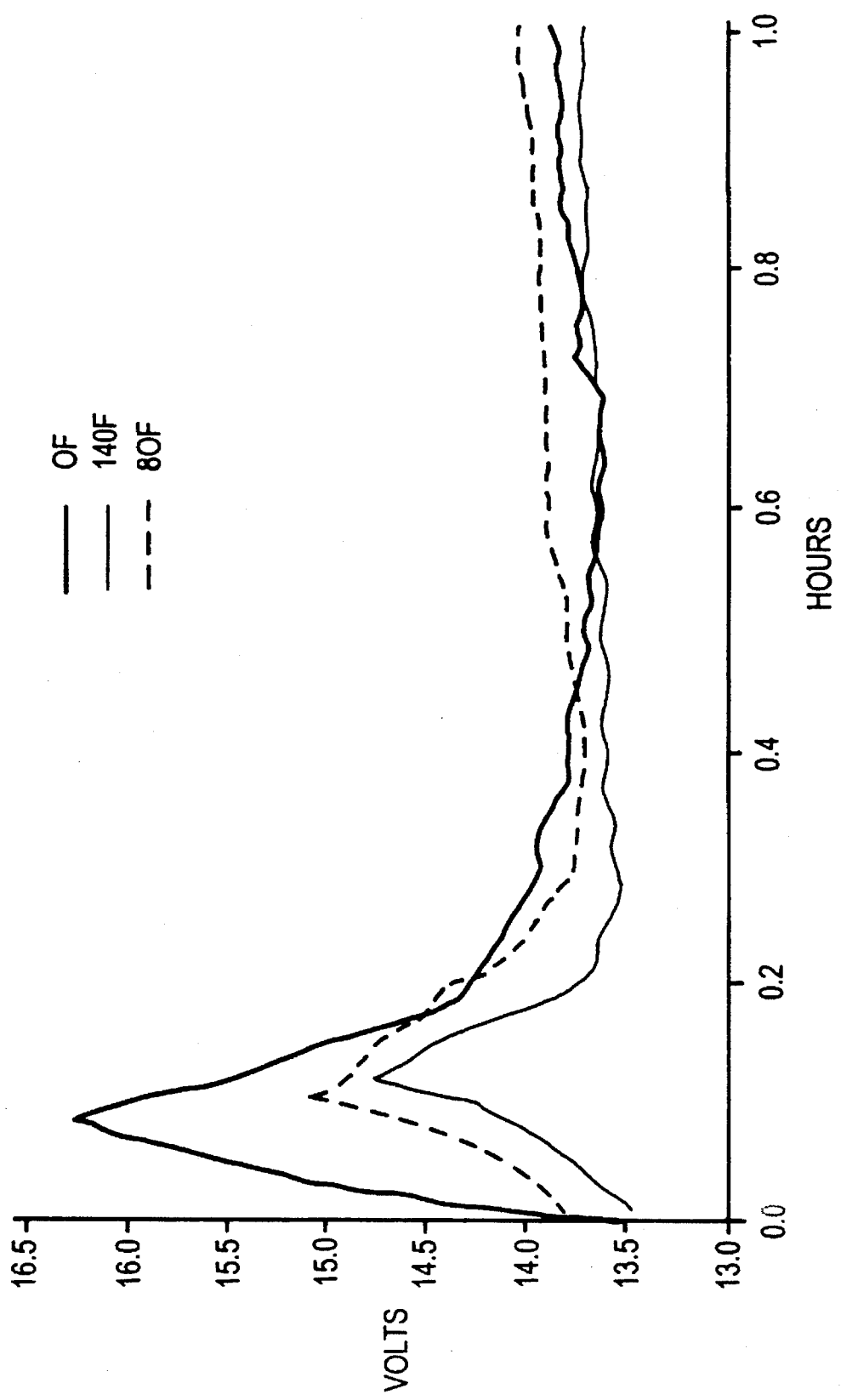
Figure 9C:
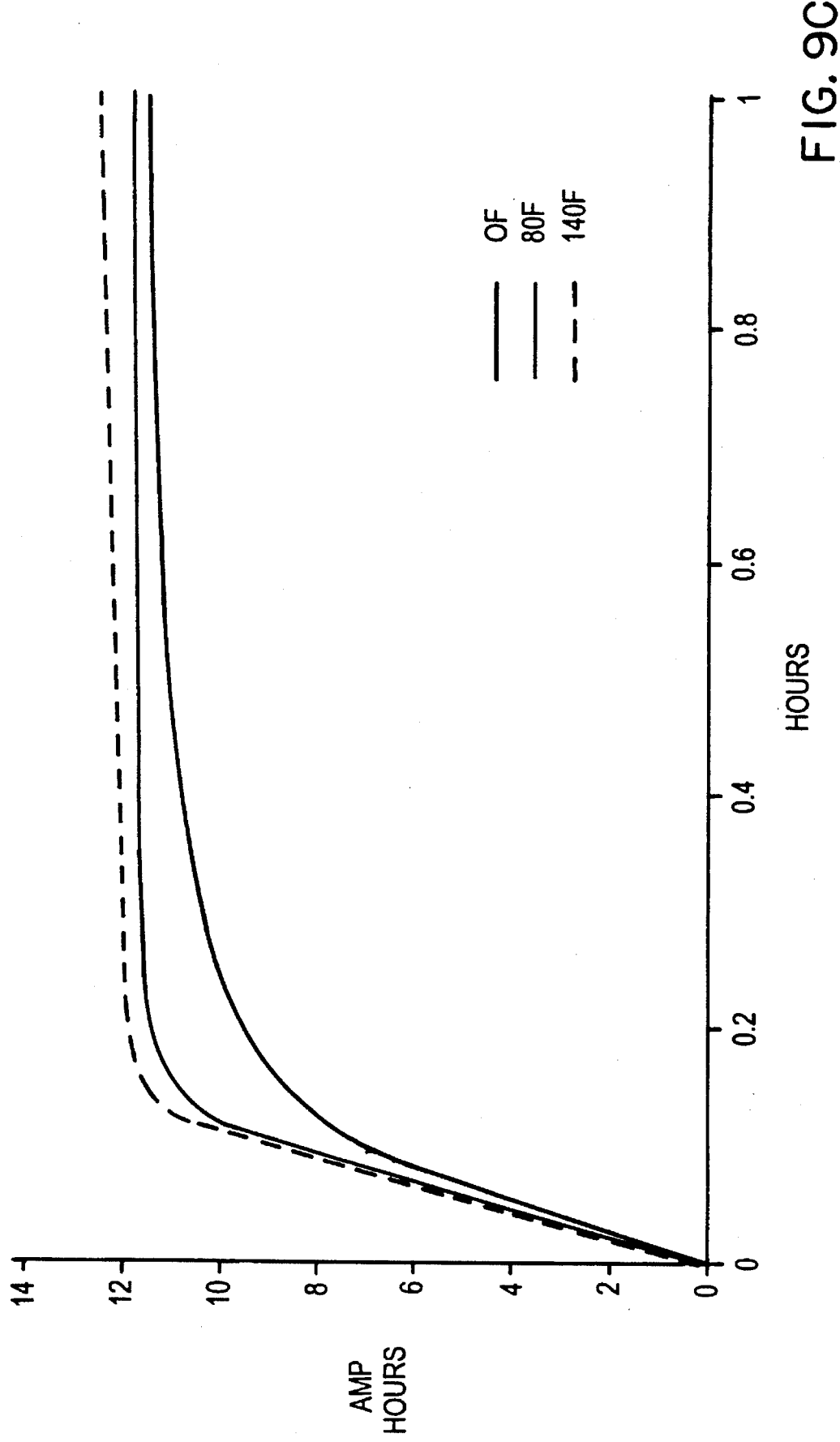

FIGS. 9A–9C illustrate the charging process for voltage, current, and ampere-hours, respectively, at three different temperatures: 0 degrees Fahrenheit, 80 degrees Fahrenheit, and 140 degrees Fahrenheit. A Gp2670 SLI battery was discharged the same amount (300 amperes for 139 seconds) at each of the temperatures. As shown, the step charger displaces the voltage the necessary amount to compensate for temperature differences during charging. Additionally, it can be seen that voltage compensation is minimized once the battery is fully charged to the point of needing no further charging, in contrast with other temperature compensation methods that treat the float voltage the same as the charging voltage.

Point 202 on FIG. 9B, obtained at 1 minute of charging, illustrates the result of starting at a charging voltage significantly lower than the battery might optimally be started at. This is because OCV+K was relatively low for the zero degree charge. Nevertheless, the subsequent zero degree voltage and current profiles clearly shows that the step charging process quickly brings the voltage up to optimize charge acceptance regardless of the starting voltage.

EXAMPLE 6

Figure 10:
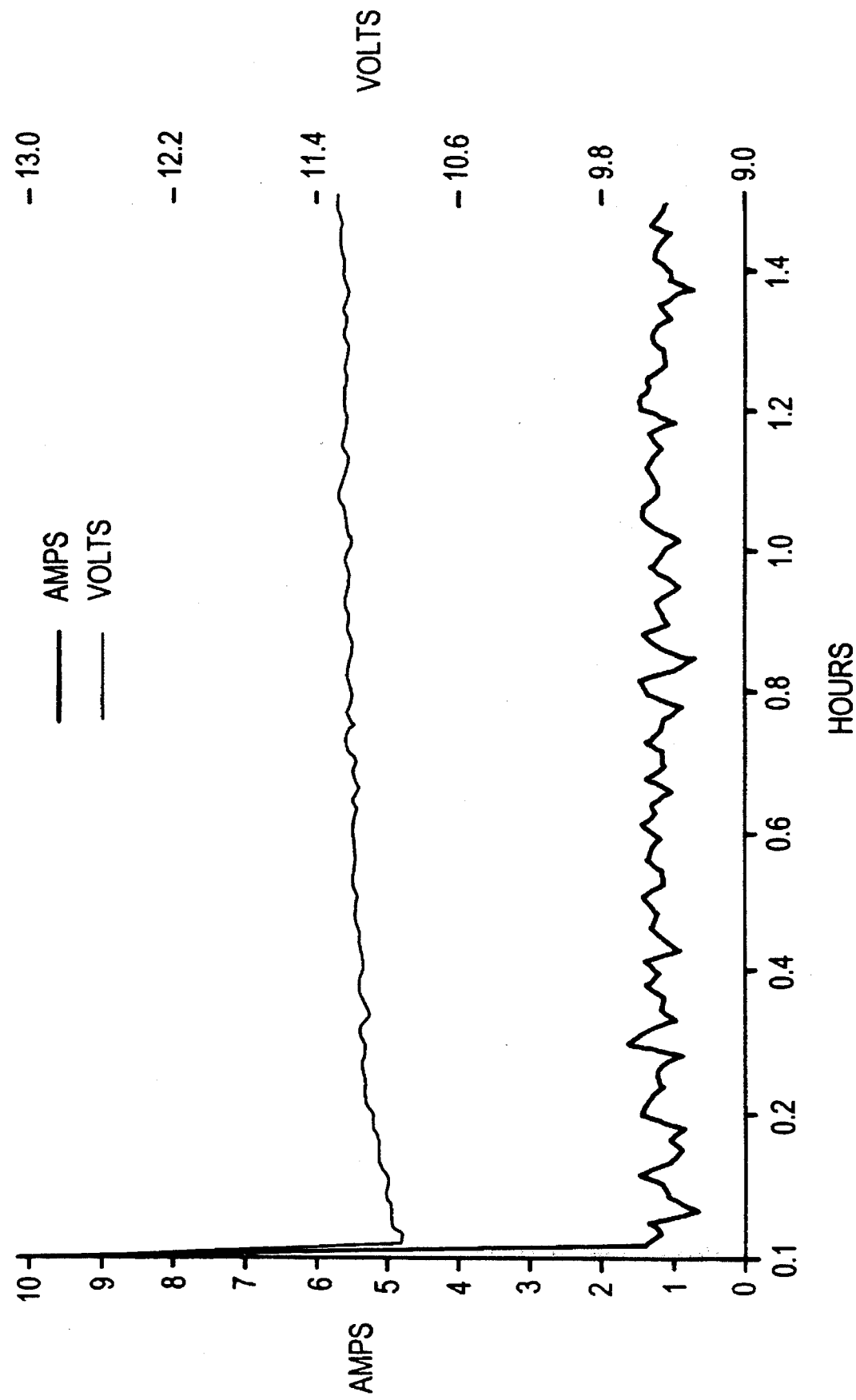

FIG. 10 illustrates the step-charger according to the invention being connected to a Gp24 battery with a shorted cell. The battery was connected without discharging. As can be seen, the voltage quickly is lowered to the reduced level of the shorted battery and a very low current is input to the battery. It should be noted that the same battery, when put on a conventional 15 volt fixed voltage charger with a 25 ampere maximum output drew the full current producing excess gas and heat in the non-shorted cells.

It can readily be appreciated that the charging system herein is capable of detecting such a shorted condition to shut off the power provided that the desired end voltage is input to the system. To this end, user input 58 can be set (for example by setting a user-controlled switch thereon) to communicate the voltage of the battery (i.e., 6 volts, 12 volts, and so on) to the system. Thus, if the system detects that the average current over a period of time is substantially stabilized, then the system may check the actual voltage level with a voltage corresponding to the user-input level to determine if the battery is shorted.

EXAMPLE 7

Figure 11:
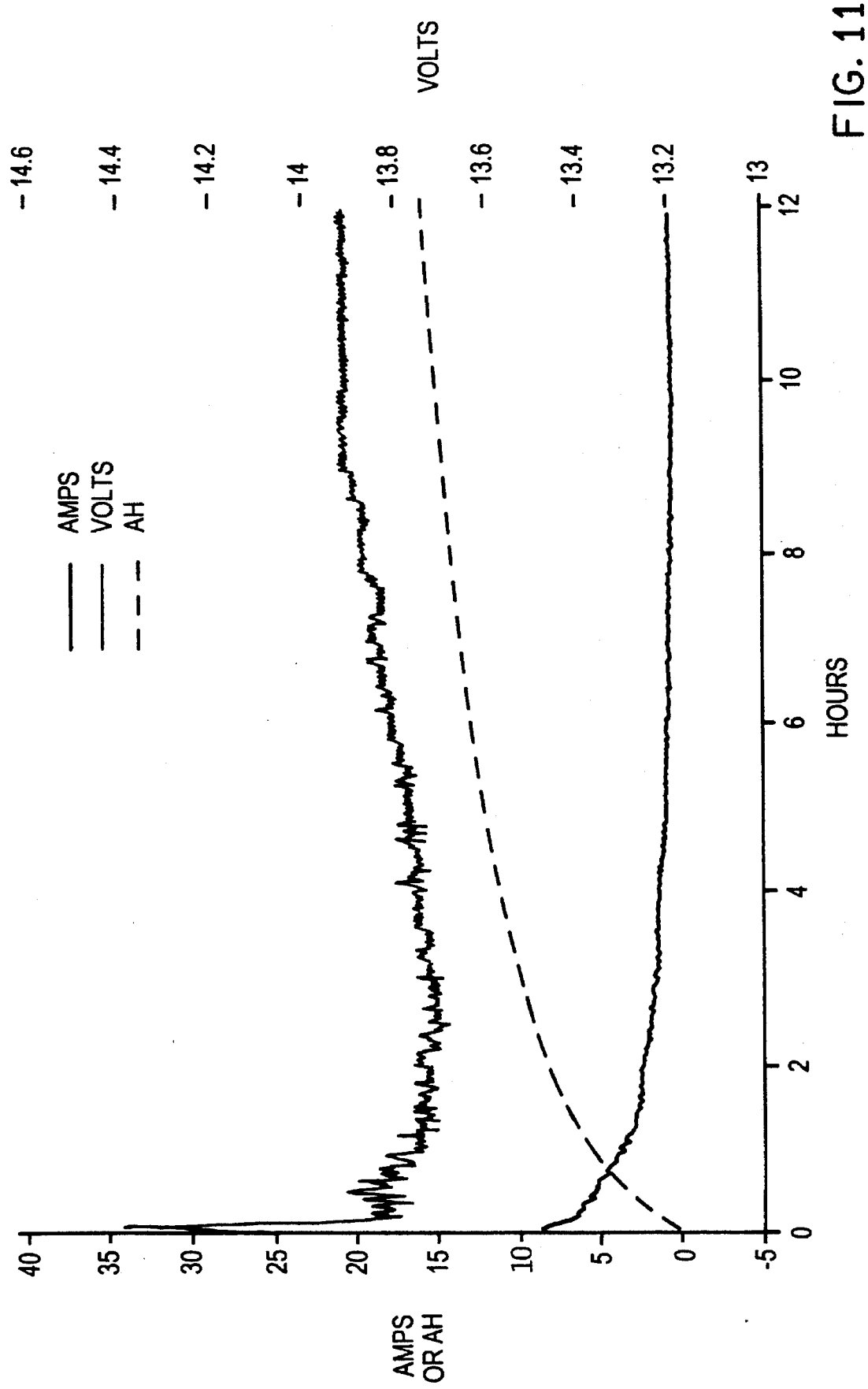

In this example, shown in FIG. 11, a Gp2670 SLI battery was discharged as a result of standing a six month ambient period before being connected to the step-charger. The charge acceptance of such a long-standing battery is greatly reduced, as determined by the rate of dissolution of lead-sulfate. Accordingly, such a battery cannot be rapidly charged. As shown in FIG. 11, the step-charger recharged the battery at its maximum effective charging based on the level of charge acceptance dictated by the battery. Although the maximum charger current output was not reached, the battery was charged for a period of time long enough to approach full charge.

What is claimed is:

1. Apparatus for charging a battery comprising:

a controllable power source providing an electrical charging output at variable current or voltage levels;

means for connecting the power source to charging terminals of the battery;

control circuitry for controlling the power source to apply the electrical charging output to the battery at a target output level, and to periodically apply the electrical charging output to the battery at an increased output level above the target output level and at a decreased output level below the target output level;

a sensor for measuring a charging input to the battery and providing a target, an increased and a decreased charging input value corresponding to the charging input at each of the target, increased and decreased output levels, respectively; and comparison circuitry responsive to the target, increased and decreased charging input values provided by the sensor for determining a first difference of the increased charging input value from the target charging input value, and a second difference of the decreased charging input value from the target charging input value, the comparison circuitry making a comparison of the first difference with the second difference and further being operatively connected to the control circuitry to adjust the target output level by increasing or decreasing the target output level in accordance with the comparison.

2. The apparatus of claim 1 wherein the electrical charging output comprises a decreased voltage level below a target voltage level, the target voltage level, and an increased voltage level above the target voltage level, and the sensor comprises a current sensor for measuring first, second and third current levels indicative of the charging input to the battery at the decreased, target and increased voltages.

3. The apparatus of claim 2 wherein the first current level is measured at the decreased voltage level before the second current level is measured at the target voltage level, and the second current level is measured at the target voltage level before the third current level is measured at the increased voltage level.

4. The apparatus of claim 2 wherein the target output voltage is increased when the difference of the first current level from the second current level is greater than the difference of the second current level from the third current level, and the target output voltage is decreased when the difference of the first current level from the second current level is less than the difference of the second current level from the third current level.

5. The apparatus of claim 2 wherein the voltage applied at the increased level is a voltage less than two percent above the target voltage level, and the voltage applied at a decreased level is a voltage less than two percent below the target voltage level.

6. The apparatus of claim 2 wherein the control circuitry includes a microprocessor and a digital-to-analog voltage converter, wherein the target voltage corresponds to a first digital output value supplied by the microprocessor to the digital-to-analog voltage converter, and the increased voltage level and decreased voltage level correspond to second and third digital output values supplied by the microprocessor to the digital-to-analog voltage converter.

7. The apparatus of claim 6 wherein the sensor includes an analog-to-digital voltage converter and the comparison circuitry includes a memory connected to the microprocessor for storing data corresponding to the target, increased and decreased charging input values provided by the analog-to-digital voltage converter, the microprocessor retrieving the stored values and determining the first and second differences to adjust the target voltage.

8. The apparatus of claim 2 wherein the first, second and third current levels stabilize after a settling time, and wherein the sensor measures the charging input at each of the current levels after predetermined first, second and third delay times.

9. The apparatus of claim 1 wherein the electrical charging output comprises a decreased current level below a target current level, the target current level, and an increased current level above the target current level, and the sensor comprises a voltage sensor for measuring first, second and third voltage levels representative of the charging input to the battery at the decreased, target and increased currents.

10. The apparatus of claim 9 wherein the target output current is decreased when the difference of the first voltage level from the second voltage level is greater than the difference of the second voltage level from the third voltage level, and the target output current is increased when the difference of the first voltage level from the second voltage level is less than difference of the second voltage level from the third voltage level.

11. The apparatus of claim 1 further comprising a resistor and means for connecting the resistor across the charging terminals of the battery.

12. The apparatus of claim 11 wherein the means for connecting the resistor is operatively connected to the system controller, the system controller connecting the resistor across the charging terminals of the battery when an average output level of the power source is substantially constant.

13. A method of charging a battery comprising the steps of:

controlling a power source to apply an electrical charging output to the battery at a target voltage or current output level, and to periodically apply the electrical charging output to the battery at an increased output level above the target output level and at a decreased output level below the target output level;

measuring a charging input to the battery and providing a target, increased and decreased charging input value corresponding to the charging input at each of the target, increased and decreased output levels, respectively;

determining a first difference of the increased charging input value from the target charging input value, and a second difference of the decreased charging input value from the target charging input value;

comparing the first and second differences with one another to provide a comparison of the differences; and adjusting the target output level by increasing or decreasing the target output level in accordance with the comparison.

14. The method of claim 13 wherein the step of controlling a power source comprises the steps of applying a voltage at a target voltage level, applying an increased voltage at a level above the target voltage level, and applying an decreased voltage at a level below the target voltage level, and the step of measuring the charging input comprises the steps of measuring the amount of current flow at the target voltage, measuring the amount of current flow at the increased voltage and measuring the amount of current flow at the decreased voltage.

15. The method of claim 14 wherein the step of determining first and second differences comprises the steps of obtaining a first differential value representing the difference between the current level at the decreased voltage and the current level at the target voltage, and obtaining a second differential value representing the difference between the current level input at the increased voltage and the current level input at the target voltage, and the step of adjusting the target voltage comprises the step of increasing the target voltage level when the first differential value is greater than the second differential value, and decreasing the target voltage level when the first differential value is less than the second differential value.

16. The method of claim 13 wherein the step of controlling a power source comprises the steps of applying a current at a target current level, applying an increased current at a level above the target current level, and applying a decreased current at a level below the target current level, and the step of measuring the charging input comprises the steps of measuring the voltage level at the target current, measuring the voltage level at the increased current and measuring the voltage level at the decreased current.

17. The method of claim 13 further comprising the steps of obtaining an average charging output level and terminating the application of the electrical charging output when the average charging output level is substantially constant.

18. The method of claim 13 further comprising the steps of obtaining an average charging output level and entering a maintenance mode when the average charging output level is substantially constant.

19. The method of claim 18 wherein the step of entering a maintenance mode comprises the step of controlling the power supply to apply a predetermined output level to charging terminals of the battery, and further comprising the step of connecting a resistor across the charging terminals of the battery.

20. The method of claim 13 further comprising the step of delaying before measuring the charging input such that the charging input is measured at a substantially constant charging output level.

21. The method of claim 13 further comprising the steps of obtaining an average charging output level, determining when the average charging output level is substantially constant, and providing an increased output charging level to the battery for a period of time to destratify the electrolyte after the average output level is determined to be substantially constant.

* * * * *

UNITED STATES PATENT AND TRADEMARK OFFICE
CERTIFICATE OF CORRECTION

PATENT NO. : 5,583,416
DATED : December 10, 1996
INVENTOR(S) : Klang, James K.

It is certified that error appears in the above-identified patent and that said Letters Patent is hereby corrected as shown below:

In Column 8, line 49: "the charging input 12" should read --the charging input $I_2$--.

IN THE CLAIMS:
Column 16, line 43: before "difference" insert --the--.

Signed and Sealed this

Twenty-fifth Day of March, 1997

*Attest:*

BRUCE LEHMAN

*Attesting Officer*   *Commissioner of Patents and Trademarks*